United States Patent [19]
Hirasawa

[11] Patent Number: 6,091,450
[45] Date of Patent: Jul. 18, 2000

[54] IMAGE PICKUP APPARATUS HAVING FUNCTION OF DETECTING PROXIMITY OF EYE

[75] Inventor: Masahide Hirasawa, Sagamihara, Japan

[73] Assignee: Canon Kabushiki Kaisha, Tokyo, Japan

[21] Appl. No.: 08/872,311

[22] Filed: Jun. 10, 1997

[30] Foreign Application Priority Data

Jun. 14, 1996 [JP] Japan ................................. 8-154123

[51] Int. Cl.⁷ .................................................. H04N 5/222
[52] U.S. Cl. ........................... 348/333; 348/372; 348/211
[58] Field of Search .................................... 348/333, 372, 348/373, 374, 375, 376; 396/374, 376

[56] References Cited

U.S. PATENT DOCUMENTS 5,559,554  9/1996  Uekane et al. .......................... 348/333
5,581,323  12/1996  Suzuki et al. .............................. 396/51
5,699,115  12/1997  Hiraki et al. ............................. 348/333

*Primary Examiner*—Wendy Garber
*Assistant Examiner*—Andrew B. Christensen
*Attorney, Agent, or Firm*—Robin, Blecker & Daley

[57] ABSTRACT

In an image pickup apparatus which is provided with both a large-size image display monitor and an EVF of the type which is provided in a video camera or the like, the EVF is provided with a proximity-of-eye detecting circuit, and if proximity of an eye of a photographer is detected, the large-size image display monitor is turned off. However, if the large-size image display monitor faces the direction of a subject side, the large-size image display monitor remains on. Accordingly, power consumption is reduced, and a subject can visually confirm a photographed image even during photography. In addition, if the proximity of the eye of the photographer is detected, control of the image pickup apparatus based on an external (for example, wireless) control signal is inhibited.

26 Claims, 14 Drawing Sheets

TIME t ⟶

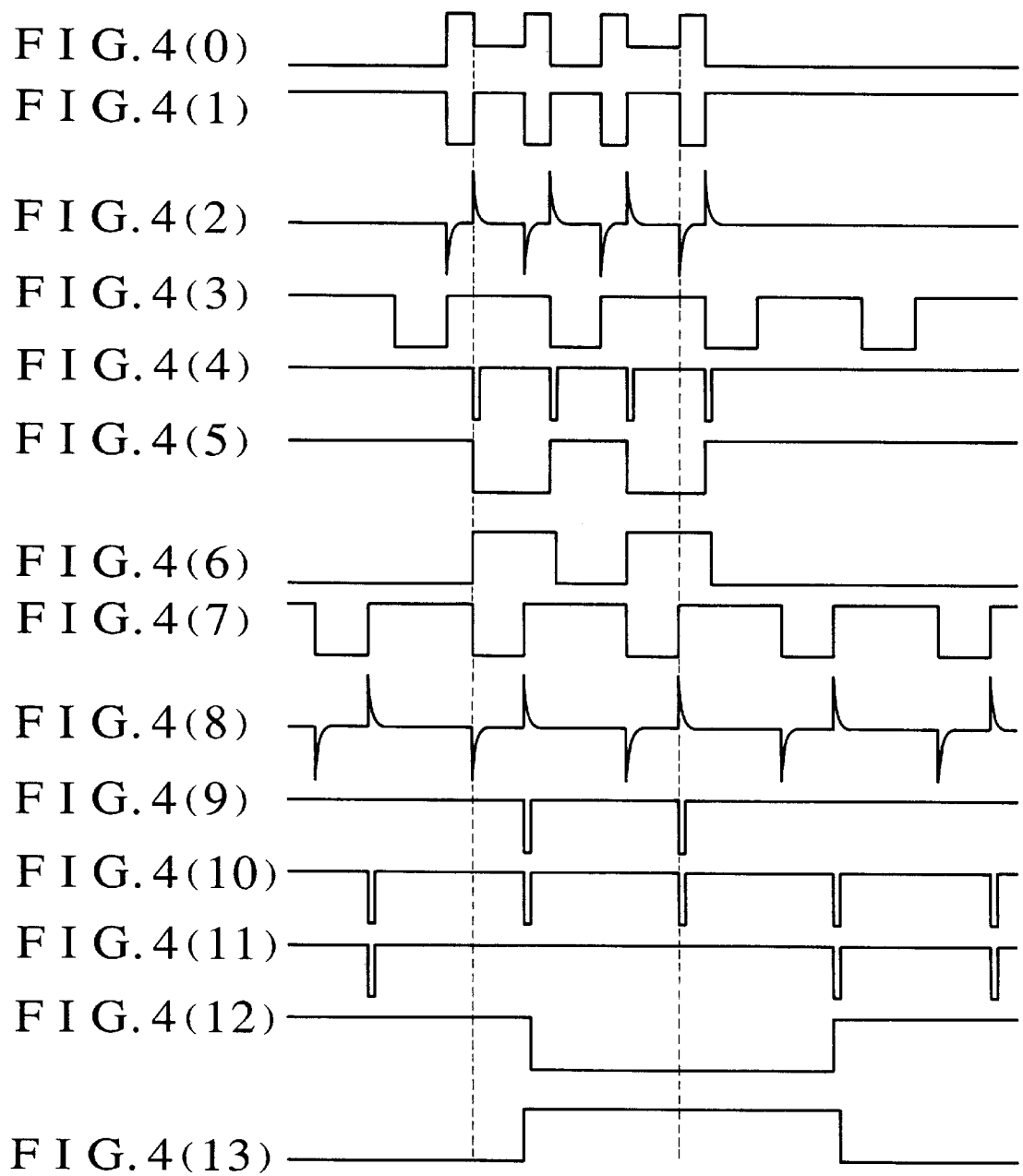

FIG. 5(a)
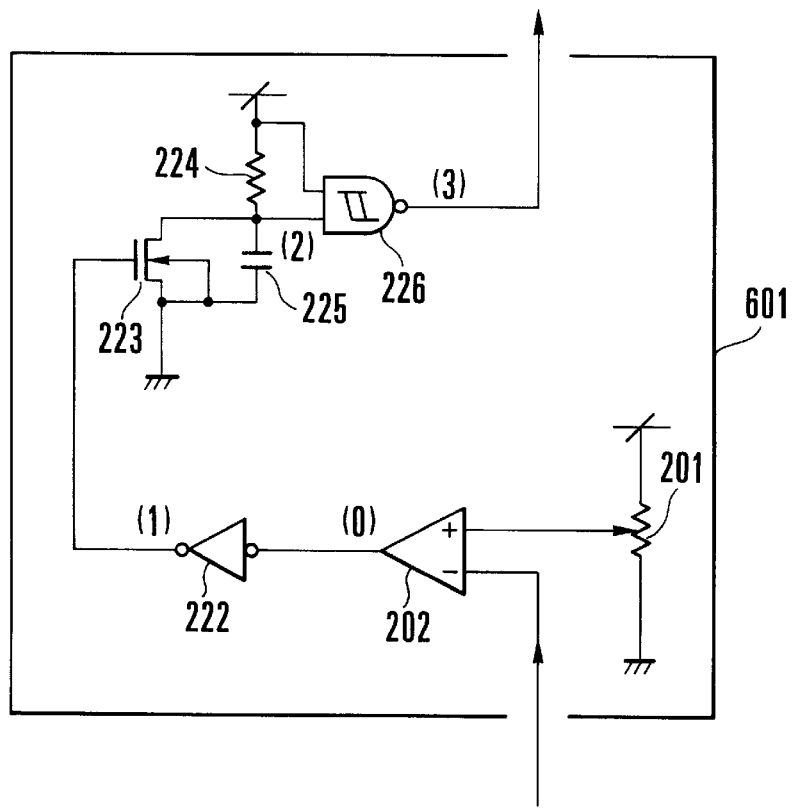
FIG. 5(b)(0)
FIG. 5(b)(1)
FIG. 5(b)(2)
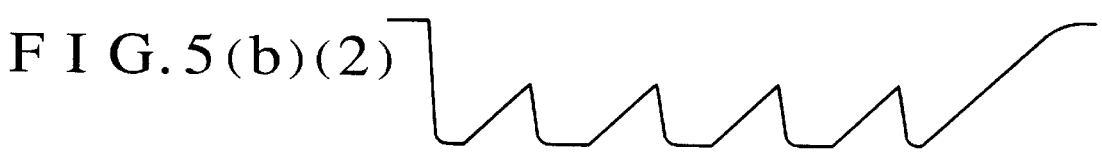
FIG. 5(b)(3)

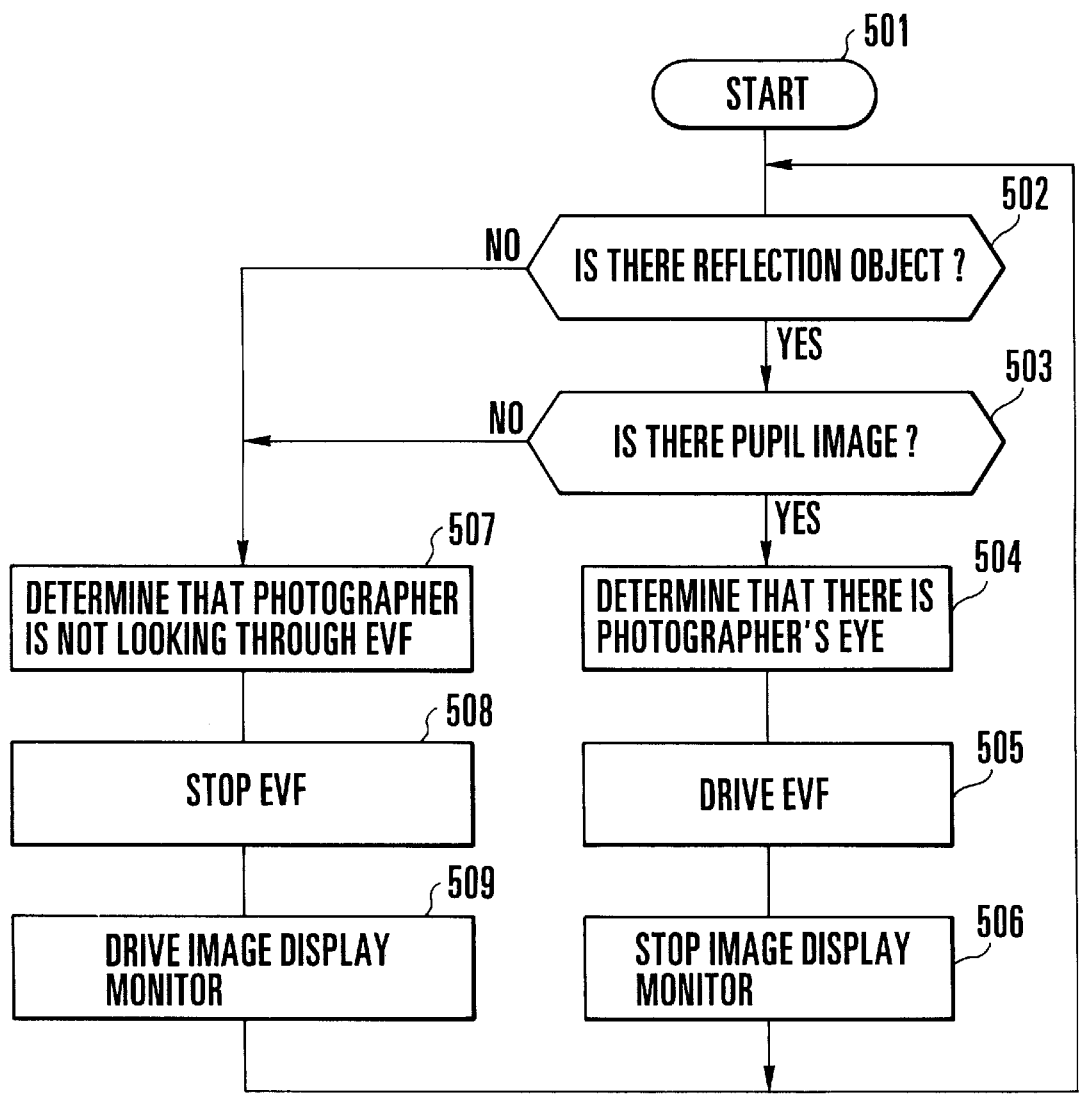

IMAGE PICKUP APPARATUS HAVING FUNCTION OF DETECTING PROXIMITY OF EYE

BACKGROUND OF THE INVENTION

1. Field of the Invention

The present invention relates to an image pickup apparatus suitable for use as, for example, a video camera or a digital still camera.

2. Description of Related Art

In general, an image pickup apparatus is provided with a viewfinder which permits a photographer to confirm a status of photography.

In the recent trend of providing an image pickup apparatus with more functions and higher performance, a video camera has been becoming commercially popular which is provided with a large-size color liquid crystal display monitor for the purpose of improving visibility, in addition to an existing viewfinder type of EVF (electronic viewfinder).

In recent years, in the field of a video camera, a silver-halide camera, a digital still camera and the like, there have been provided many types of products which employ a wireless remote controller (hereinafter referred to as the remote controller) because of its usefulness and for the purpose of reducing the number of body-side switches per product so that the entire size of a product can be reduced. The body of such a product can be operated by transmitting a command from its remote controller to the body in the form of modulated infrared light, a frequency-modulated wave or the like.

In such a product, in order to increase transmission/reception sensitivity to signals such as modulated infrared light, it is usual that the directional angle of infrared light on the remote-controller side and the acceptance angle on the body side are made wide to some extent.

However, in the above-described prior art, the large-size image display monitor involves large power consumption, and even if the large-size image display monitor is not needed, for example, even if a photographer is looking through the viewfinder, wasteful power will be consumed if the large-size image display monitor is being driven. If the large-size image display monitor is to be driven or stopped, the photographer must intentionally operate a switch. However, during photography using the viewfinder, the photographer often forgets to stop the driving of the large-size image display monitor.

If the remote controller is employed, a number of problems will be encountered because the directional angle for receiving a signal transmitted from the remote controller is wide or because a command signal from the remote controller travels toward the body not only rectilinearly but also while being reflected by an obstacle such as wall. For example, when a plurality of persons are performing photography with their respective image pickup apparatus in the same place at the same time, if any one of them operates a remote controller, the image pickup apparatus of another person may receive a command from the remote controller and perform an unexpected operation.

BRIEF SUMMARY OF THE INVENTION

In the light of the above-described problems, it is an object of the present invention to greatly reduce power consumption due to an external cause without impairing operability.

Another object of the present invention is to provide an image pickup apparatus which can be prevented from malfunctioning due to a control signal coming from outside.

To achieve at least one of the above objects, in accordance with one aspect of the present invention, there is provided an image pickup apparatus which comprises a viewfinder through which to observe a subject, a monitor capable of displaying a picked-up image in a direction of a subject side or in a direction of a photographer side, first detecting means for detecting whether a photographer is in proximity to the viewfinder, changing means for changing an image-displaying direction of the monitor to the direction of the photographer side and to the direction of the subject side, second detecting means for detecting the image-displaying direction of the monitor, inhibiting means for inhibiting driving of the monitor if the first detecting means detects that the photographer is in proximity to the viewfinder, and driving means for driving the monitor if the image-displaying direction of the monitor does not face the direction of the photographer side, even if the first detecting means detects that the photographer is in proximity to the viewfinder.

In accordance with another aspect of the present invention, there is provided a method of controlling an image pickup apparatus which includes a viewfinder through which to observe a subject and a monitor capable of displaying a picked-up image in a direction of a subject side or in a direction of a photographer side, the method comprising a first detecting step of detecting whether a photographer is in proximity to the viewfinder, a changing step of changing an image-displaying direction of the monitor to the direction of the photographer side and to the direction of the subject side, a second detecting step of detecting the image-displaying direction of the monitor, an inhibiting step of inhibiting driving of the monitor if the first detecting means detects that the photographer is in proximity to the viewfinder, and a driving step of driving the monitor if the image-displaying direction of the monitor does not face the direction of the photographer side, even if the first detecting means detects that the photographer is in proximity to the viewfinder.

In accordance with another aspect of the present invention, there is provided a storage medium in which is stored a program for executing operation processing for an image pickup apparatus which is provided with a viewfinder through which to observe a subject and a monitor capable of displaying a picked-up image in a direction of a subject side or in a direction of a photographer side, the storage medium permitting the following processing to be executed which comprises the steps of detecting whether a photographer is in proximity to the viewfinder, detecting an image-displaying direction of the monitor, inhibiting driving of the monitor if it is detected that the photographer is in proximity to the viewfinder, and driving the monitor if the image-displaying direction of the monitor does not face the direction of the photographer side, even if it is detected that the photographer is in proximity to the viewfinder.

In accordance with another aspect of the present invention, there is provided a storage medium in which is stored a program for executing operation processing for an image pickup apparatus which is provided with a viewfinder through which to observe a subject and a monitor capable of displaying a picked-up image in a direction of a subject side or in a direction of a photographer side, the storage medium permitting the following processing to be executed which comprises the steps of detecting whether an eye of a photographer is in proximity to the viewfinder, detecting an image-displaying direction of the monitor, inhibiting driving of the monitor if it is detected that the eye of the photographer is in proximity to the viewfinder, and driving the monitor if the image-displaying direction of the monitor does not face the direction of the photographer side, even if it is detected that the eye of the photographer is in proximity to the viewfinder.

In accordance with another aspect of the present invention, there is provided a storage medium in which is stored a program for executing operation processing for an image pickup apparatus which is provided with a viewfinder through which to observe a subject and a monitor capable of displaying a picked-up image in a direction of a subject side or in a direction of a photographer side, the storage medium permitting the following processing to be executed which comprises the steps of detecting whether an eye of a photographer is in proximity to the viewfinder, detecting an image-displaying direction of the monitor, inhibiting driving of the monitor if it is detected that the eye of the photographer is in proximity to the viewfinder, and driving the monitor if the image-displaying direction of the monitor faces the direction of the subject side, even if it is detected that the eye of the photographer is in proximity to the viewfinder.

In accordance with another aspect of the present invention, there is provided an image pickup apparatus which comprises a viewfinder through which to observe a subject, a monitor capable of displaying a picked-up image in a direction of a subject side or in a direction of a photographer side, first detecting means for detecting whether a photographer is in proximity to the viewfinder, changing means for changing an image-displaying direction of the monitor to the direction of the photographer side and to the direction of the subject side, second detecting means for detecting the image-displaying direction of the monitor, inhibiting means for inhibiting driving of a backlight of the monitor if the first detecting means detects that the photographer is in proximity to the viewfinder, and driving means for driving the backlight of the monitor if the image-displaying direction of the monitor does not face the direction of the photographer side, even if the first detecting means detects that the photographer is in proximity to the viewfinder.

In accordance with another aspect of the present invention, there is provided an image pickup apparatus which comprises operating means provided at a body of the image pickup apparatus, for generating a signal for operating the image pickup apparatus, receiving means for receiving, from outside, a signal for operating the image pickup apparatus, displaying means for permitting observation of a subject, detecting means for detecting whether a photographer is in proximity to the displaying means, control means for controlling the image pickup apparatus on the basis of the signal generated by the operating means or the signal received by the receiving means, and inhibiting means for inhibiting control based on a signal which is received by the receiving means when the detecting means detects that the photographer is in proximity to the displaying means.

In accordance with another aspect of the present invention, there is provided a method of controlling an image pickup apparatus provided with a display part which permits observation of a subject, the method comprising an operating step of generating a signal for operating the image pickup apparatus, at a body of the image pickup apparatus, a receiving step of receiving, from outside, a signal for operating the image pickup apparatus, a detecting step of detecting whether a photographer is in proximity to the display part, a control step of controlling the image pickup apparatus on the basis of the signal generated in the operating step or the signal received in the receiving step, and an inhibiting step of inhibiting control based on a signal which is received in the receiving step when it is detected in the detecting step that the photographer is in proximity to the display part.

In accordance with another aspect of the present invention, there is provided a method of controlling an image pickup apparatus provided with a viewfinder, the method comprising an operating step of generating a signal for operating the image pickup apparatus, at a body of the image pickup apparatus, a receiving step of receiving, from outside, a signal for operating the image pickup apparatus, a detecting step of detecting whether an eye of a photographer is in proximity to the viewfinder, a control step of controlling the image pickup apparatus on the basis of the signal generated in the operating step or the signal received in the receiving step, and an inhibiting step of inhibiting control based on a signal which is received in the receiving step when it is detected in the detecting step that the eye of the photographer is in proximity to the viewfinder.

In accordance with another aspect of the present invention, there is provided a storage medium in which is stored a program for executing operation processing for an image pickup apparatus provided with a display part which permits observation of a subject, the storage medium permitting the following processing to be executed which comprises the steps of generating a signal for operating the image pickup apparatus, receiving, from outside, a signal for operating the image pickup apparatus, detecting whether a photographer is in proximity to the display part, controlling the image pickup apparatus on the basis of the signal generated or the signal received from outside, and inhibiting control based on a signal which is received when it is detected that the photographer is in proximity to the display part.

In accordance with another aspect of the present invention, there is provided a storage medium in which is stored a program for executing operation processing for an image pickup apparatus provided with a viewfinder, the storage medium permitting the following processing to be executed which comprises the steps of generating a signal for operating the image pickup apparatus, receiving, from outside, a signal for operating the image pickup apparatus, detecting whether an eye of a photographer is in proximity to the viewfinder, controlling the image pickup apparatus on the basis of the signal generated or the signal received from outside, and inhibiting control based on a signal which is received when it is detected that the eye of the photographer is in proximity to the viewfinder.

The above and other objects, features and advantages of the present invention will become apparent from the following description taken in conjunction with the accompanying drawings.

BRIEF DESCRIPTION OF THE SEVERAL VIEWS OF THE DRAWING

FIGS. 4(0) to 4(13) are timing charts of electrical signals appearing in predetermined portions in FIG. 2.

FIG. 5(a) is a circuit diagram of a reflection object detecting circuit;

FIGS. 5(b)(0) to 5(b)(3) are charts showing electrical signals appearing in predetermined portions in FIG. 5(a);

FIG. 6 is a flowchart showing the display sequence of the image pickup apparatus according to the first embodiment of the present invention;

DETAILED DESCRIPTION OF THE INVENTION

Image pickup apparatus according to embodiments of the present invention will be described below with reference to the accompanying drawings.

First Embodiment

Figure 1:
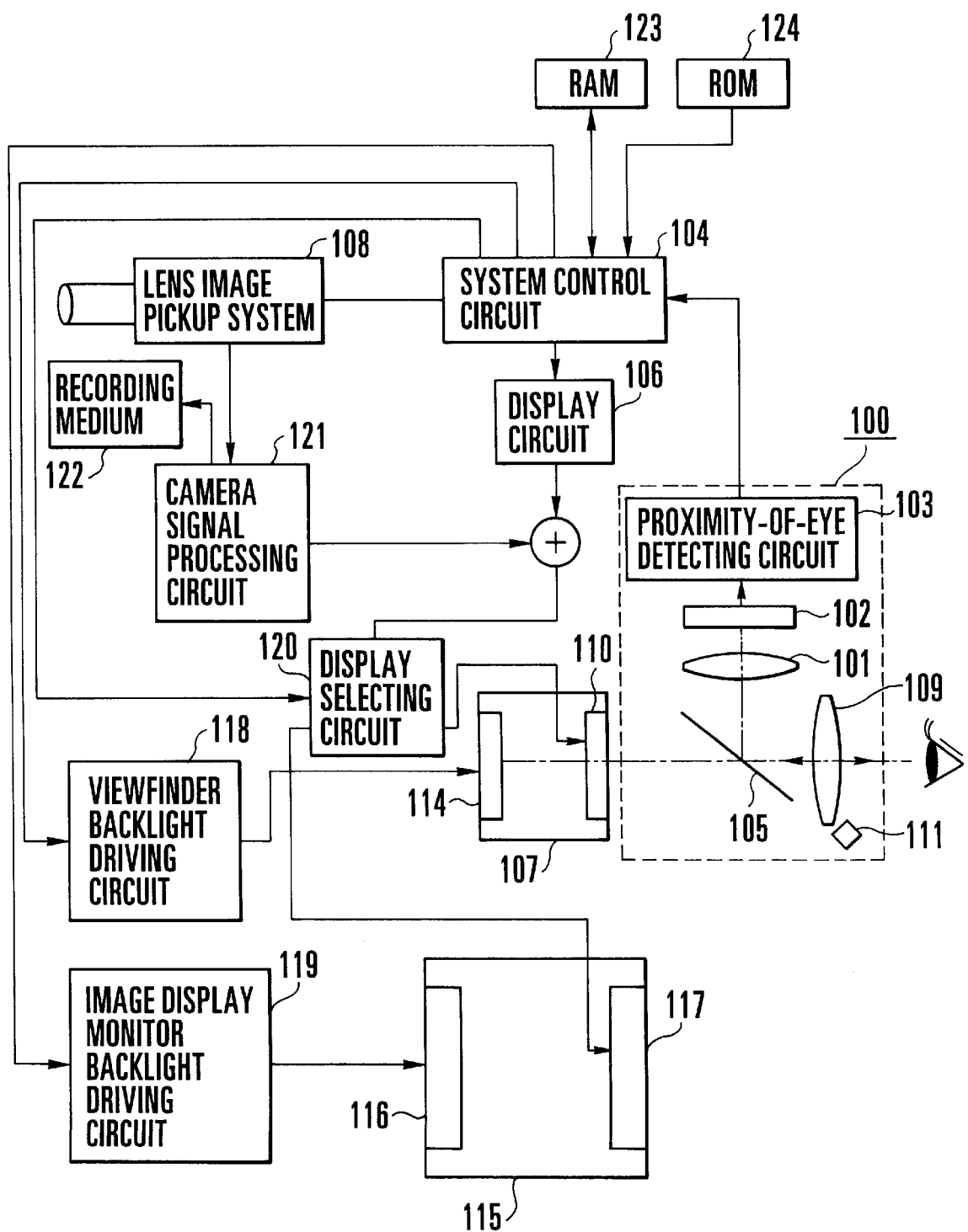
FIG. 1 is a block diagram showing the arrangement of an image pickup apparatus according to a first embodiment of the present invention.

FIG. 1 is a block diagram showing the arrangement of an image pickup apparatus according to a first embodiment.

In the arrangement shown in FIG. 1, a system control circuit 104 which is composed of a CPU controls various processing operations of the entire image pickup apparatus and performs adjustment of the focus, the aperture, etc., of a lens in a lens image pickup system 108. A subject image picked up by an image pickup element is converted into an electrical image signal, and the electrical image signal is converted into a standardized video signal such as an NTSC signal by a camera signal processing circuit 121 and recorded on a recording medium 122 such as magnetic tape. A ROM 124 stores a program to be executed by the system control circuit 104, and a RAM 123 downloads the program stored in the ROM 124 and provides a work area for the system control circuit 104.

An electronic viewfinder (hereinafter referred to as the EVF) 107 is provided with a display element 110 and a backlight part 114 for illuminating the display element 110 from behind. The image pickup apparatus is provided with an image display monitor 115 which employs a large-size panel, and the image display monitor 115 includes a display element 117 and a backlight part 116 as constituent elements. A display selecting circuit 120 selects and controls the driving of the EVF 107 and the driving of the image display monitor 115 on the basis of the output of a proximity-of-eye detecting circuit 103 which will be described later.

A proximity-of-eye detecting part 100 for detecting proximity of a photographer's eye to the EVF 107, i.e., whether the photographer is looking through the EVF 107, is disposed before the EVF 107. The proximity-of-eye detecting part 100 is composed of an eyepiece lens 109, an infrared light-emitting diode 111 which illuminates the eye of the photographer with infrared light to illuminate the eyeball, an infrared emission driving circuit (not shown), a dichroic mirror 105 which transmits visible light and reflects infrared light, a converging lens 101 which converges the infrared light reflected by the dichroic mirror 105, a photoelectric conversion element 102 such as a CCD which converts into an electrical signal the infrared light converged by the converging lens 101, the proximity-of-eye detecting circuit 103 which determines whether the eye of the photographer is in proximity to the EVF 107, on the basis of image data relative to the eyeball, which is converted into the electrical signal by the photoelectric conversion element 102, and the like.

Since the dichroic mirror 105 transmits visible light, the photographer can observe the display surface of the display element 110 through the eyepiece lens 109. On the other hand, since the dichroic mirror 105 reflects infrared light, the dichroic mirror 105 reflects a reflected image of the cornea of the eyeball of the photographer illuminated by the infrared light-emitting diode 111. The reflected cornea image reflected by the dichroic mirror 105 is converged by the converging lens 101 and focused on the photoelectric conversion element 102.

One example of detection of proximity of the eye of the photographer will be described below.

Figures 3A, 3B, 3C:
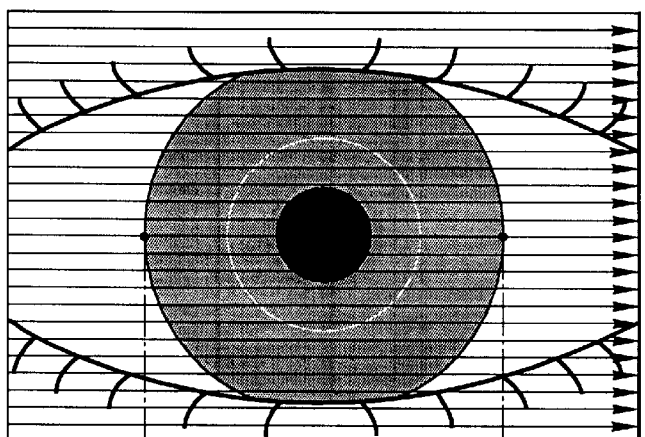
FIG. 3(a) shows a reflected cornea image on a photoelectric conversion element.
FIG. 3(b) shows a signal of the reflected cornea image which corresponds to one horizontal scanning period.
FIG. 3(c) shows a signal indicative of one horizontal scanning period of the photoelectric conversion element.

FIG. 3(a) shows a reflected cornea image on the photoelectric conversion element 102. As shown in FIG. 3(a), the reflected cornea image is horizontally sliced and the obtained signals are sequentially sent to the camera signal processing circuit 121. FIG. 3(c) shows a signal indicative of one horizontal scanning period of the photoelectric conversion element 102. FIG. 3(b) shows a portion extracted from a signal outputted from the photoelectric conversion element 102, the portion corresponding to one horizontal scanning period. In the extracted portion, its output level is high for the portion of the white of the eye, whereas it is low for the portion of the pupil of the eye.

Figure 2:
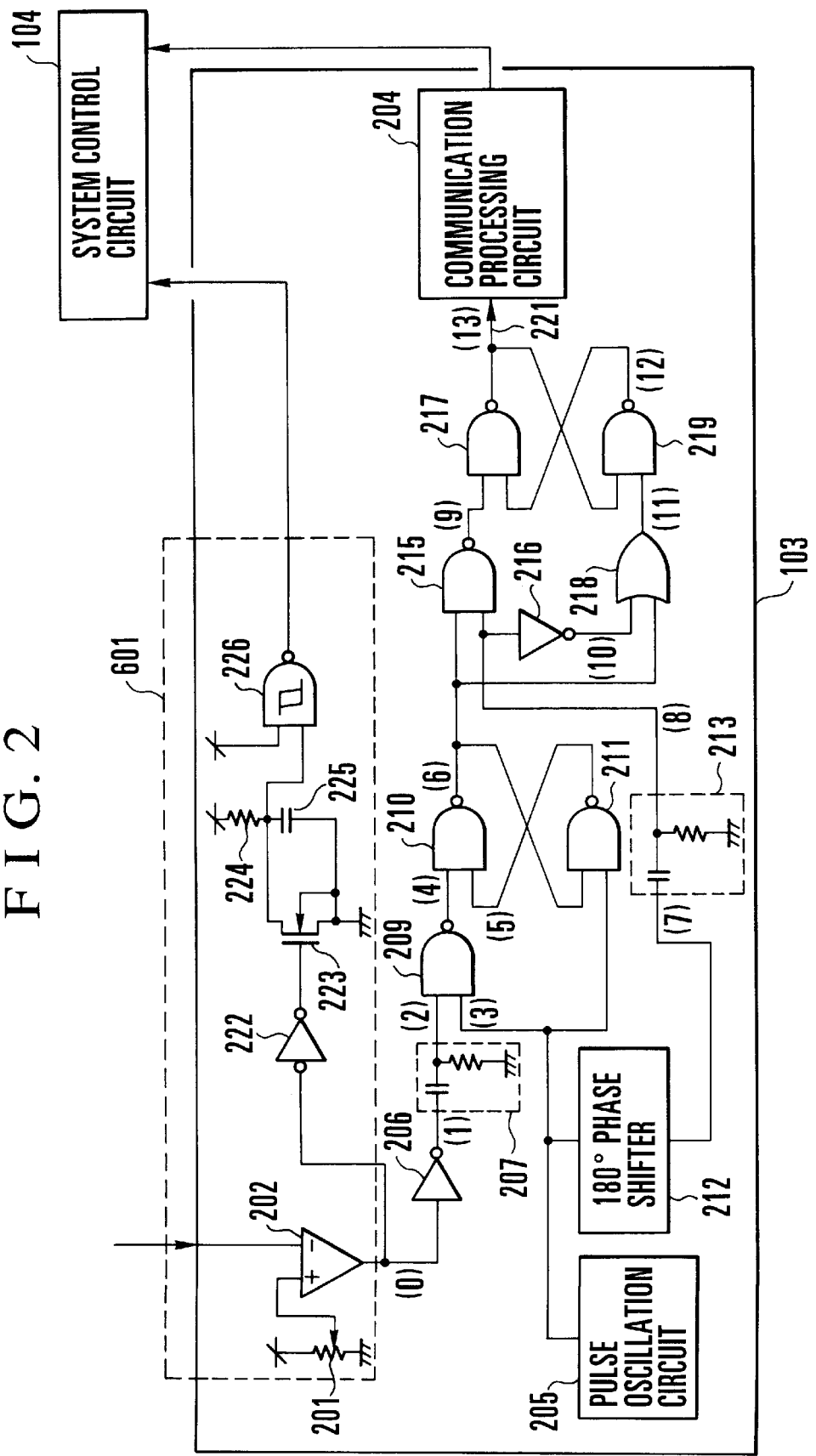
FIG. 2 is a view showing one example of a proximity-of-eye detecting circuit according to embodiments of the present invention.

FIG. 2 shows one example of the arrangement of the proximity-of-eye detecting circuit 103. FIGS. 4(0) to 4(13) are timing charts of signals indicated by parenthesized numbers in FIG. 2. The operation of proximity-of-eye detection will be described below with reference to these figures.

A slicer 202 slices the output of the photoelectric conversion element 102 in accordance with a level set by a variable resistor 201, and provides the waveform shown in FIG. 4(0).

FIG. 4(1) shows a signal obtained by inverting the signal of FIG. 4(0) by means of an inverter 206, and the signal of FIG. 4(2) is obtained by differentiating the signal of FIG. 4(1) by means of a differentiating circuit 207. (If the photographer is looking through the EVF 107, a rising edge is detected at the left edge of the pupil of the eyeball image projected on the photoelectric conversion element 102.)

A pulse oscillation circuit 205 generates the signal shown in FIG. 4(3) (this signal corresponds to that of FIG. 3(c)). If the signals of FIGS. 4(2) and 4(3) are inputted to a NAND gate 209, the signal shown in FIG. 4(4) is obtained. The signal shown in FIG. 4(6) is obtained by latching the signal of FIG. 4(4) by one horizontal scanning period.

FIG. 4(7) shows a signal obtained by phaseshifting the signal of FIG. 4(3) by 180° by means of a 180° phase shifter 212. If this signal is differentiated by a differentiating circuit 213, the signal shown in FIG. 4(8) is obtained.

If the signals of FIGS. 4(6) and 4(8) are inputted to a NAND circuit 215, the signal shown in FIG. 4(9) is obtained which latches the signal of FIG. 4(4) for each horizontal scanning period when this signal is varying.

The signal of FIG. 4(9) is latched by NAND circuits 217 and 219, and the signal shown in FIG. 4(13) is finally obtained which is at its high level when an image of the eyeball is being picked up by the photoelectric conversion element 102.

FIG. 4(10) shows a signal obtained from the signal of FIG. 4(8) by means of an inverter 216, and the signal shown in FIG. 4(11) is obtained by inputting the signals of FIG. 4(6) and 4(10) into an OR circuit 218.

Further, the signal of FIG. 4(9) is processed by the NAND circuits 217 and 219, whereby the signal shown in FIG. 4(13) is obtained which is at the high level when an image of the pupil is being picked up by the photoelectric conversion element 102. The signal of FIG. 4(13) is outputted to the system control circuit 104 via a communication processing circuit 204.

A circuit which determines not whether the eyeball is in proximity to the EVF 107 but only whether a reflection object is present in the vicinity of the EVF 107 can be realized by a portion 601 of FIG. 2. FIG. 5(a) shows the portion 601 of FIG. 2 on an enlarged scale, and the determining operation of the circuit will be described below with reference to FIG. 5(a) as well as FIGS. 5(b)(0) to 5(b)(3).

If there is a reflection object in proximity to the EVF 107, the signal shown in FIG. 5(b)(0), which is the output signal of the slicer 202, is converted into the signal shown in FIG. 5(b)(1) via a waveform shaping circuit 222.

A transistor 223 is turned on by a rise of the signal of FIG. 5(b)(1), and the charge stored in a capacitor 225 is discharged through the transistor 223. In this discharged state, if the potential shown in FIG. 5(b)(2) falls below the lower threshold of the Schmitt trigger 226, the signal shown in FIG. 5(b)(3), which is the output signal of the Schmitt trigger 226, is inverted.

If the signal of FIG. 5(b)(1) goes to its low level, the transistor 223 is turned off and the capacitor 225 is charged through a resistor 224, and the potential of FIG. 5(b)(2) rises.

However, if the time constant of the charging of the capacitor 225 is made large compared to the periodic output variations of the eyeball image shown in FIG. 5(b)(1), the potential does not reach a level exceeding the higher threshold of the Schmitt trigger 226 as shown in FIG. 5(b)(2), so that the signal of FIG. 5(b)(3) is maintained at its high level.

If the reflection object disappears and the signal of FIG. 5(b)(1) continues to be at the low level, the level of the signal of FIG. 5(b)(2) rises above the higher threshold of the Schmitt trigger 226 as shown in FIG. 5(b)(2) and the signal of FIG. 5(b)(3) goes to its low level.

Although the circuit of FIG. 5(a) makes only a decision as to a reflection object in the above-described manner, the circuit of FIG. 2 detects proximity of an eye by making two kinds of decisions: a decision as to whether a reflection object is present and a decision as to whether the reflection object is an eyeball.

FIG. 6 is a flowchart showing the sequence of processing of the system control circuit 104, for appropriately executing image display processing. An example of the operation of driving the EVF 107 and the image display monitor 115 in the image pickup apparatus shown in FIG. 1 will be described below with reference to FIG. 6. Incidentally, the proximity-of-eye detecting circuit 103 detects proximity of an eye by means of the circuit arrangement shown in FIG. 2.

If a power source (not shown) is turned on and the image pickup apparatus is brought to a photography-enabled state, the processing of the operation is started in Step 501.

In Step 502, it is detected whether there is a reflection object before the EVF 107, on the basis of the output from the proximity-of-eye detecting circuit 103.

If there is a reflection object before the EVF 107, it is detected in Step 503 whether the reflection object is a pupil.

If it is detected that the reflection object is a pupil, it is determined in Step 504 that the eye of the photographer is in proximity to the EVF 107, i.e., the photographer is looking through the EVF 107. In Step 505, the system control circuit 104 transmits to the display selecting circuit 120 a signal to the effect that the pupil has been detected, and the display selecting circuit 120 drives the EVF 107. At the same time, in Step 506, the display selecting circuit 120 stops the driving of the image display monitor 115. At this time, the system control circuit 104 turns off both the display element 117 and the backlight part 116 of the image display monitor 115. However, the system control circuit 104 may provide control to turn off only the backlight part 116 of large power consumption so as to ensure that the image display monitor 115 is rapidly activated when it is turned on immediately after having been turned off.

On the other hand, if it is determined in Step 502 that there is not a reflection object, or if it is determined in Step 503 that the reflection object is not a pupil, it is determined in Step 507 that the photographer is not looking through the EVF 107. In Step 509, the display selecting circuit 120 drives the image display monitor 115, and, in Step 508, stops the operation of the EVF 107. In this case as well, the system control circuit 104 turns off both the display element 110 and the backlight part 114. However, the system control circuit 104 may turn off only the backlight part 114.

In this manner, if the photographer is looking through the EVF 107, the system control circuit 104 automatically stops the driving of the image display monitor 115 and drives the EVF 107, whereas if the photographer is not looking through the EVF 107, the system control circuit 104 stops the driving of the EVF 107 and drives the image display monitor 115. Accordingly, only display means which is normally used can be made operative, so that it is possible to avoid an increase in power consumption while achieving a simple operation.

Incidentally, since detection of a pupil is performed in detection of proximity of an eye, the EVF 107 can be securely turned on only when a human is looking through the EVF 107, and can be prevented from being turned on if another obstacle is in proximity to the EVF 107. Accordingly, the operation of detecting proximity of an eye can be made secure.

Second Embodiment

Although the above-described first embodiment is arranged to perform detection of the pupil of an eye and accurately detect proximity of the eye, a simplified circuit which detects only the presence or absence of a reflection object may be adopted.

Such a proximity-of-eye detecting circuit is arranged as shown in FIG. 5(a), and its operation is as described above.

Figure 7:
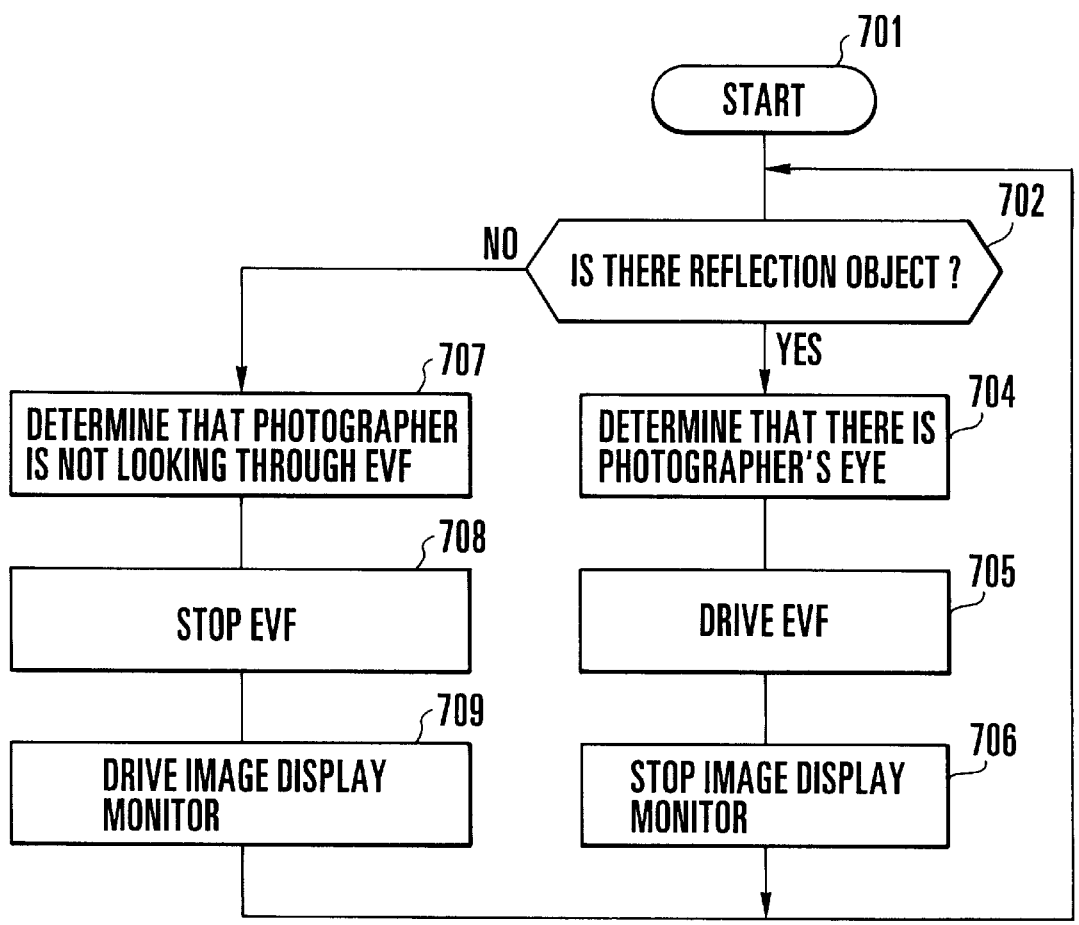
FIG. 7 is a flowchart showing the display sequence of an image pickup apparatus according to a second embodiment of the present invention.

FIG. 7 is a flowchart of the processing of the system control circuit 104 which performs processing of the operation of an image pickup apparatus according to a second embodiment, for detecting only the presence or absence of a reflection object. The second embodiment will be described below with reference to the flowchart of FIG. 7.

The processing of the operation of the image pickup apparatus is started in Step 701, and it is detected in Step 702 whether there is a reflection object before the EVF 107, on the basis of the output from the proximity-of-eye detecting circuit 103. If it is detected that there is a reflection object before EVF 107, it is determined that an eye of the photographer is in proximity to the EVF 107, i.e., the photographer is looking through the EVF 107 (Step 704). In Step 705, the system control circuit 104 transmits to the display selecting circuit 120 a notice to the effect that the proximity of the eye has been detected, and the display selecting circuit 120 drives the EVF 107 in response to the notice. At the same time, in Step 706, the display selecting circuit 120 stops the driving of the image display monitor 115.

On the other hand, if, in Step 702, the proximity-of-eye detecting circuit 103 detects that there is not a reflection object, the system control circuit 104 determines in Step 707 that the photographer is not looking through the EVF 107. In Step 709, the system control circuit 104 causes the display selecting circuit 120 to drive the image display monitor 115, and, in Step 708, stops the operation of the EVF 107.

Third Embodiment

Figure 8:
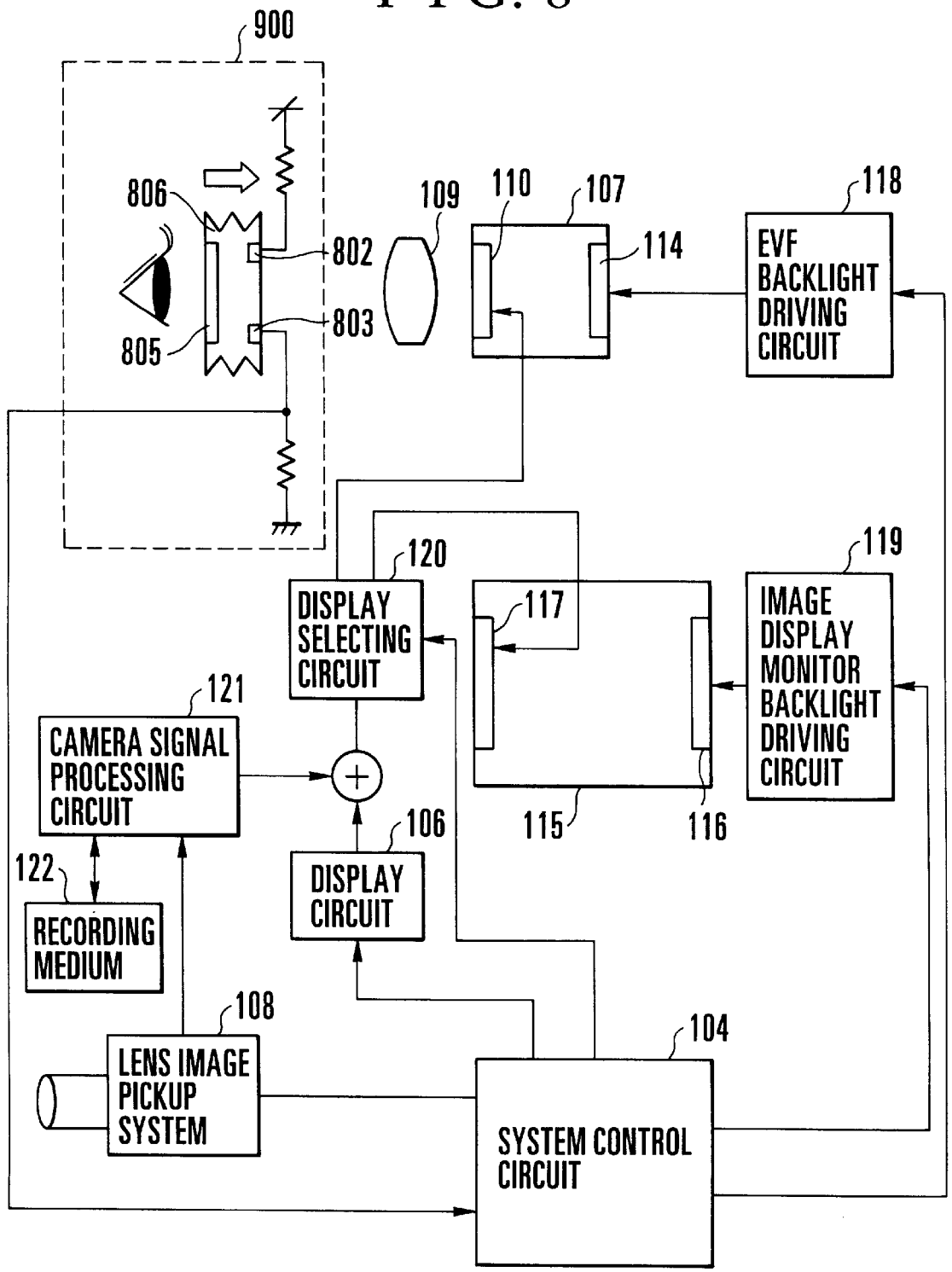
FIG. 8 is a block diagram showing the arrangement of an image pickup apparatus according to a third embodiment of the present invention.

FIG. 8 shows an arrangement which performs detection of proximity of an eye by means of a structure simpler than that used in the above-described embodiment.

In FIG. 8, reference numeral 900 denotes a proximity-of-eye detecting unit according to a third embodiment. The proximity-of-eye detecting unit 900 includes contacts 802, 803 and 805 and an eye cup 806 having a bellows-like structure.

If a photographer's eye is brought in proximity to the EVF 107, the eye cup 806 is pressed and the contacts 802, 803 and 805 are electrically connected.

According to the detection signal of the proximity-of-eye detecting unit 900, the system control circuit 104 controls the driving of the EVF 107 and the image display monitor 115. The arrangement of the image pickup apparatus is identical to that of the above-described image pickup apparatus except for the proximity-of-eye detecting unit 900, and the description of the other constituent elements is omitted.

The subsequent processing based on the output of the proximity-of-eye detecting unit 900 is similar to the flowchart of FIG. 7 described above in connection with the second embodiment, and the description thereof is omitted.

Fourth Embodiment

FIGS. 9(a) to 9(d) are diagrammatic perspective views of an image pickup apparatus according to a fourth embodiment. The image pickup apparatus according to the fourth embodiment is identical to that shown in FIG. 1, except that a monitor-direction detecting sensor 125 for detecting the image-displaying direction of an image display monitor 903 is added to the arrangement of FIG. 1 as shown in FIG. 10, and the description of the arrangement of the fourth embodiment is, therefore, omitted for the sake of simplicity.

In the image pickup apparatus according to the fourth embodiment, the image display monitor 903 is connected to an image pickup apparatus body 905 via connecting shaft members 904a and 904b.

The image display monitor 903 is supported for rotation in two directions indicated by arrows x and y in FIGS. 9(a) to 9(d) by the connecting shaft members 904a and 904b, respectively. Accordingly, the image display monitor 903 can be moved so that the image displayed on the image display monitor 903 can be visually confirmed on a photographer side and on a subject side.

Specifically, the image display monitor 903 can be rotated about the axis of the connecting shaft member 904b, i.e., in the direction of the arrow y, so that the image display monitor 903 can open and close with respect to a side of the image pickup apparatus body 905. Furthermore, the image display monitor 903 can be rotated about the axis of the connecting shaft member 904a, i.e., in the direction of the arrow x, so that the display surface of the image display monitor 903 can be rotated toward the photographer side and the subject side.

The connecting shaft member 904a is provided with the monitor-direction detecting sensor 125 which detects the image-displaying direction of the image display monitor 903 on the basis of the rotation of the image display monitor 903 which is rotated about the connecting shaft member 904a.

Figure 9A:
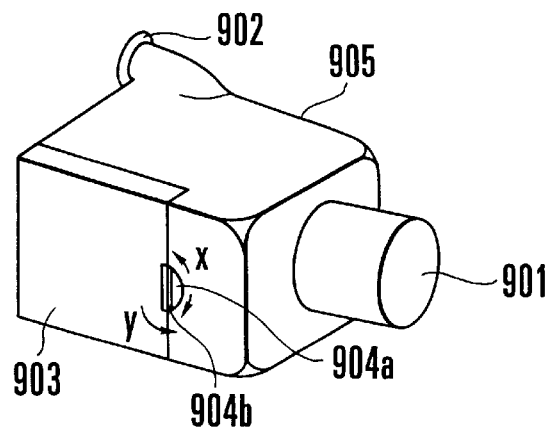
FIGS. 9(a) to 9(d) are diagrammatic perspective views of an image pickup apparatus according to a fourth embodiment of the present invention.
Figure 10:
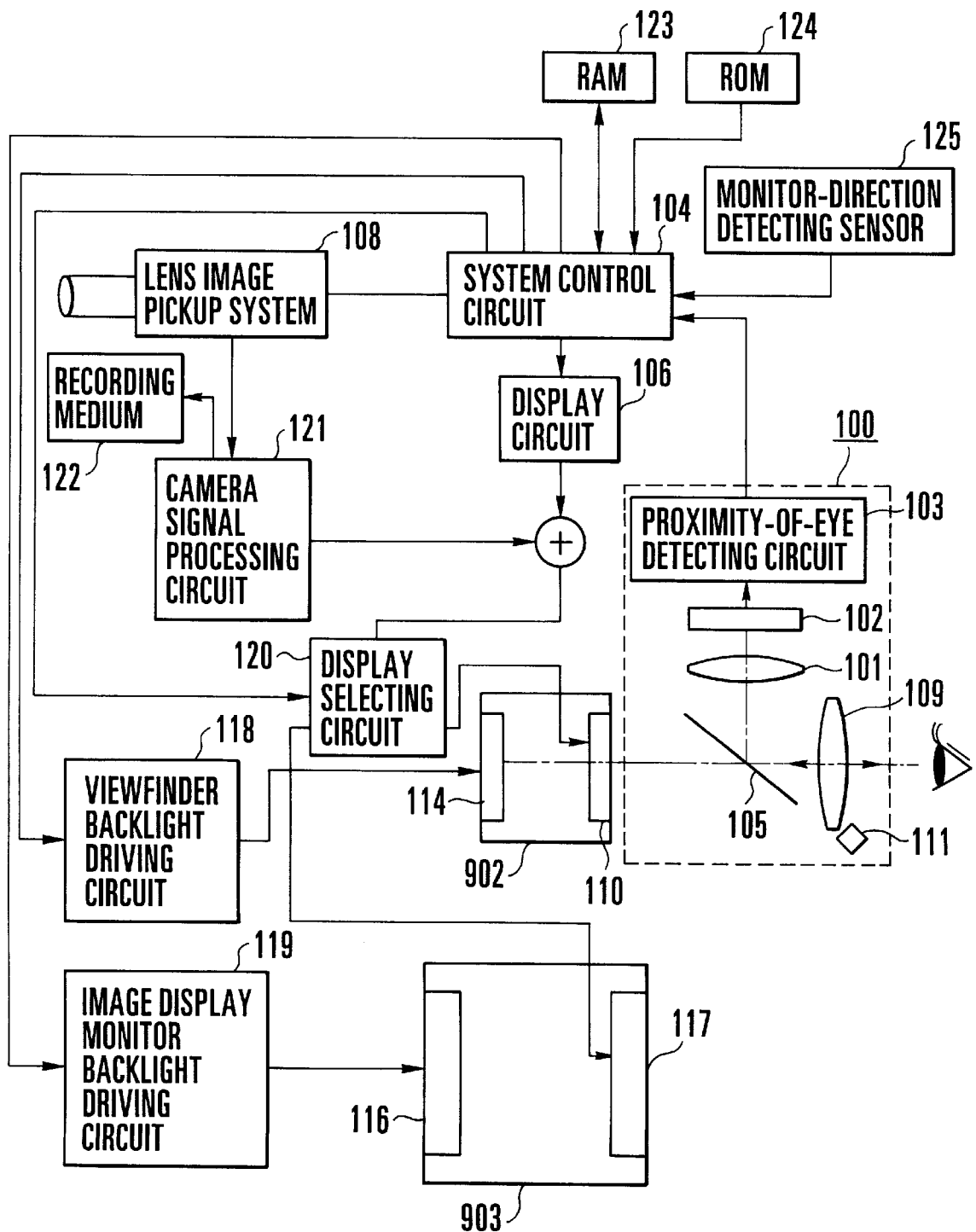
FIG. 10 is a block diagram showing the arrangement of the image pickup apparatus according to the fourth embodiment of the present invention.

The image display monitor 903 shown in FIG. 9(a) is placed in a retracted state on the side of the image pickup apparatus body 905.

Figure 9B:
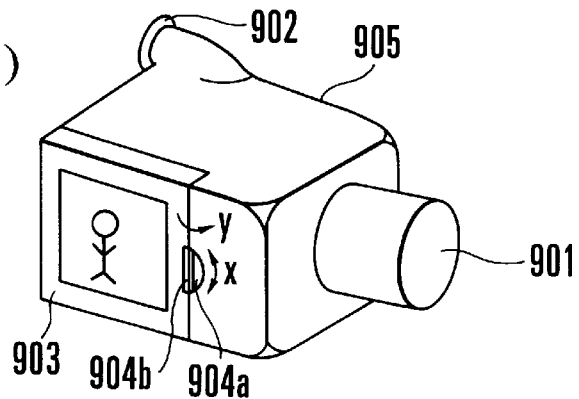
Figure 9C:
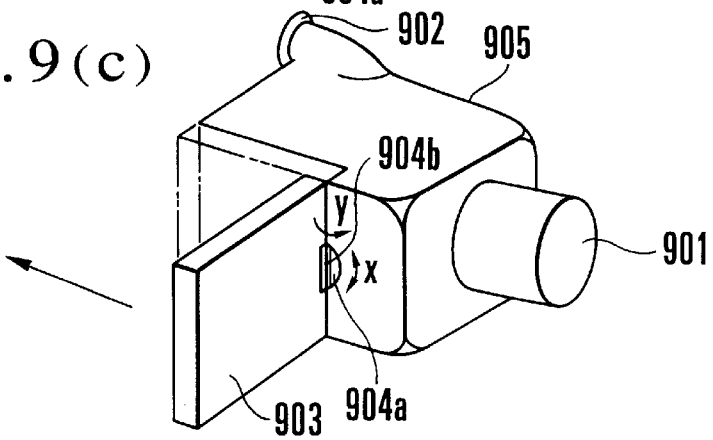
Figure 9D:
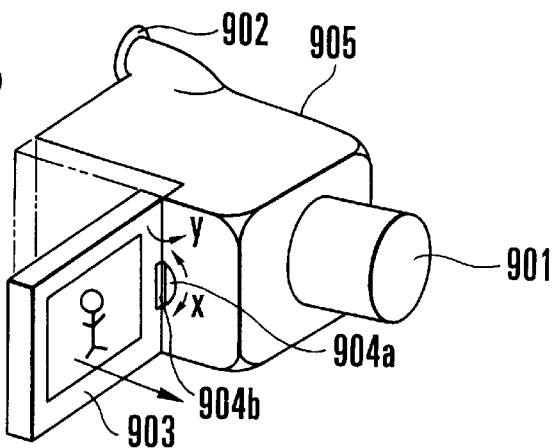

The states of the image display monitor 903 shown in FIGS. 9(b), 9(c) and 9(d) enable visual confirmation of the image displayed on the image display monitor 903. The image display monitor 903 shown in FIG. 9(b) is in the state of being rotated from the retracted state of FIG. 9(a) about each of the connecting shaft members 904a and 904b, so that the displayed image can be visually confirmed.

In the state shown in FIG. 9(c), the image display monitor 903 is in the state of being rotated from the retracted state of FIG. 9(a) in the y direction about the connecting shaft member 904b. At this time, the image display monitor 903 is turned toward the photographer side. Accordingly, the photographer can perform photography while viewing the image display monitor 903.

In the state shown in FIG. 9(d), the image display monitor 903 is in the state of being rotated from the state of FIG. 9(c) in the x direction about the connecting shaft member 904a, and is turned toward the subject side. Accordingly, photography can be performed while an image to be photographed is being visually confirmed on the subject side.

Figure 11:
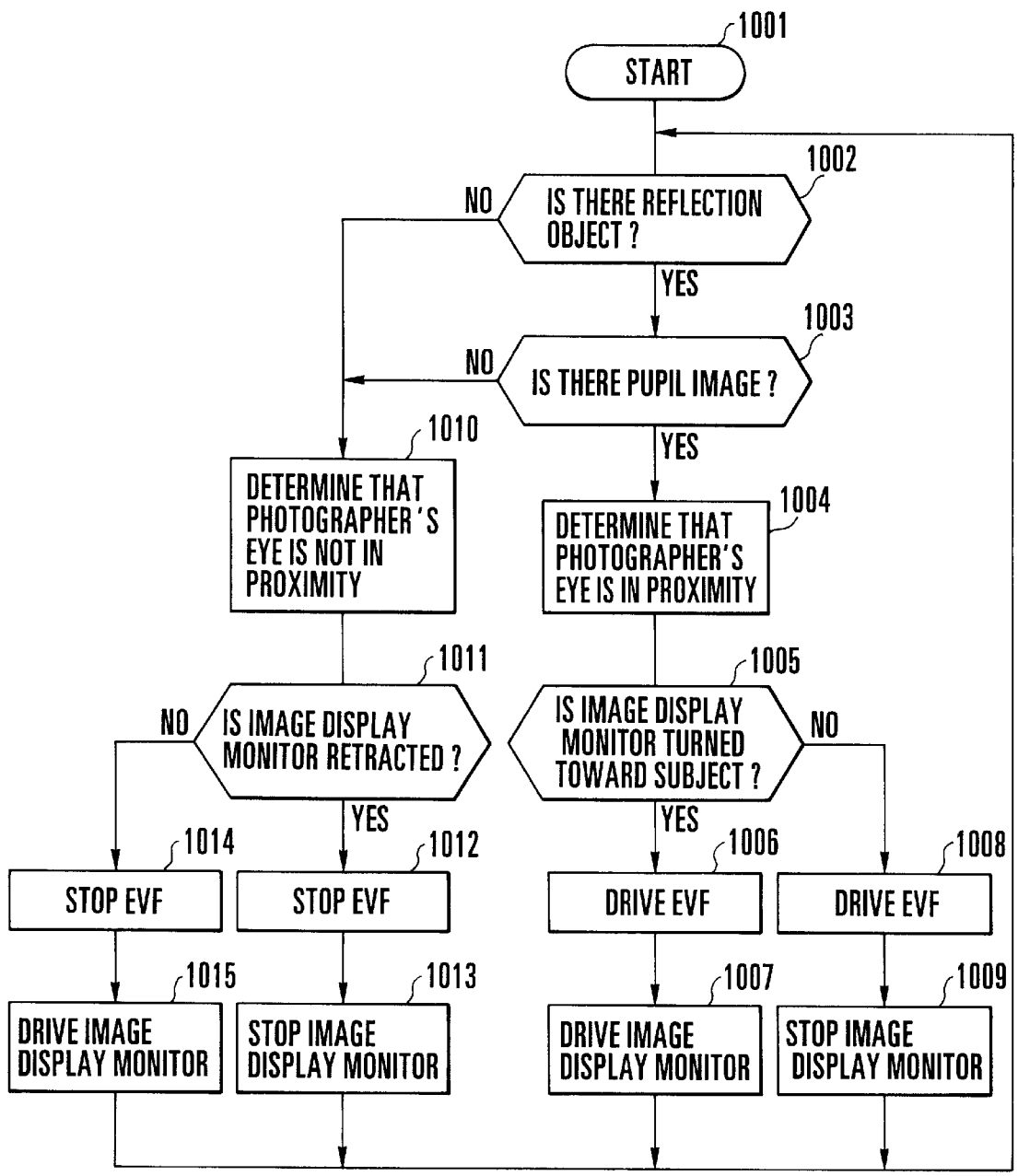
FIG. 11 is a flowchart showing the display sequence of the image pickup apparatus according to the fourth embodiment of the present invention.

FIG. 11 is a flowchart showing the display operations of an EVF 902 and the image display monitor 903 in the image pickup apparatus shown in FIGS. 9(a) to 9(d). The display control operation of the image pickup apparatus having the arrangement shown in FIGS. 9(a) to 9(d) will be described below with reference to FIG. 11. Incidentally, the following processing is executed by the system control circuit 104 according to the detection signal of the proximity-of-eye detecting circuit 103. The system control circuit 104 executes the following processing on the basis of the program stored in the ROM 124.

In Step 1001, the processing of the operation of the image pickup apparatus is started. In Step 1002, it is detected whether there is a reflection object before the EVF 902, on the basis of the output from the proximity-of-eye detecting circuit 103. If there is a reflection object before the EVF 902, it is detected in Step 1003 whether the reflection object is a pupil. Incidentally, the proximity-of-eye detecting circuit 103 employs the circuit shown in FIG. 2.

If the reflection object is a pupil, the system control circuit 104 determines in Step 1004 that an eye of the photographer is in proximity to the EVF 902, i.e., the photographer is looking through the EVF 902, according to the detection signal of the proximity-of-eye detecting circuit 103.

At that time, it is detected whether the image display monitor 903 is turned toward a subject (Step 1005). If the image display monitor 903 is not turned toward the subject, the display selecting circuit 120 drives the EVF 902 (Step 1008) and stops the driving of the image display monitor 903 in Step 1009. Accordingly, it is possible to reduce the electric power required to drive the image display monitor 903 which is not being used by the photographer. On the other hand, if the image display monitor 903 is turned toward the subject, the display selecting circuit 120 drives the EVF 902 (Step 1006) and causes the image display monitor 903 to display an image (Step 1007). At this time, the image to be photographed can be visually confirmed on the subject side as well.

On the other hand, if it is detected in Step 1002 that there is not a reflection object, or if it is detected in Step 1003 that the reflection object is not a pupil, it is determined in Step 1010 that the photographer is not looking through the EVF 902.

At that time, it is detected whether the image display monitor 903 is retracted (step 1011). If the image display monitor 903 is retracted, the display selecting circuit 120 stops the EVF 902 (Step 1012) and also stops the image display monitor 903 (Step 1013).

If the image display monitor 903 is not retracted, the display selecting circuit 120 stops the EVF 902 (Step 1014) and drives the image display monitor 903 (Step 1015).

As described above, display means, i.e., the EVF 902 and the image display monitor 903, are appropriately driven and controlled according to the result of detection as to the proximity of the eye to the EVF 902 and the image-displaying direction of the image display monitor 903, so that good operability and a reduction in power consumption can be achieved.

In the above-described fourth embodiment, if the proximity of an eye to the EVF 902 is detected, the image display monitor 903 is driven only when the image-displaying direction of the image display monitor 903 faces the direction of the subject side. However, the image display monitor 903 may be driven when the image-displaying direction of the image display monitor 903 faces a direction other than the photographer side. This arrangement can be realized by the arrangement of the image pickup apparatus shown in FIG. 1, and the object of the fourth embodiment can be achieved.

In the above-described arrangement, the driving of the entire unit of each of the EVF 902 and the image display monitor 903 may be controlled, or only the backlight part of each of the EVF 902 and the image display monitor 903 may be controlled. In either case, the object of the fourth embodiment can be achieved.

Although the fourth embodiment uses an EVF as its viewfinder, an optical viewfinder may be used. In this case as well, the operation of driving the image display monitor 903 according to the result of proximity-of-eye detection is identical to the above-described driving operation.

Fifth Embodiment

Figure 12:
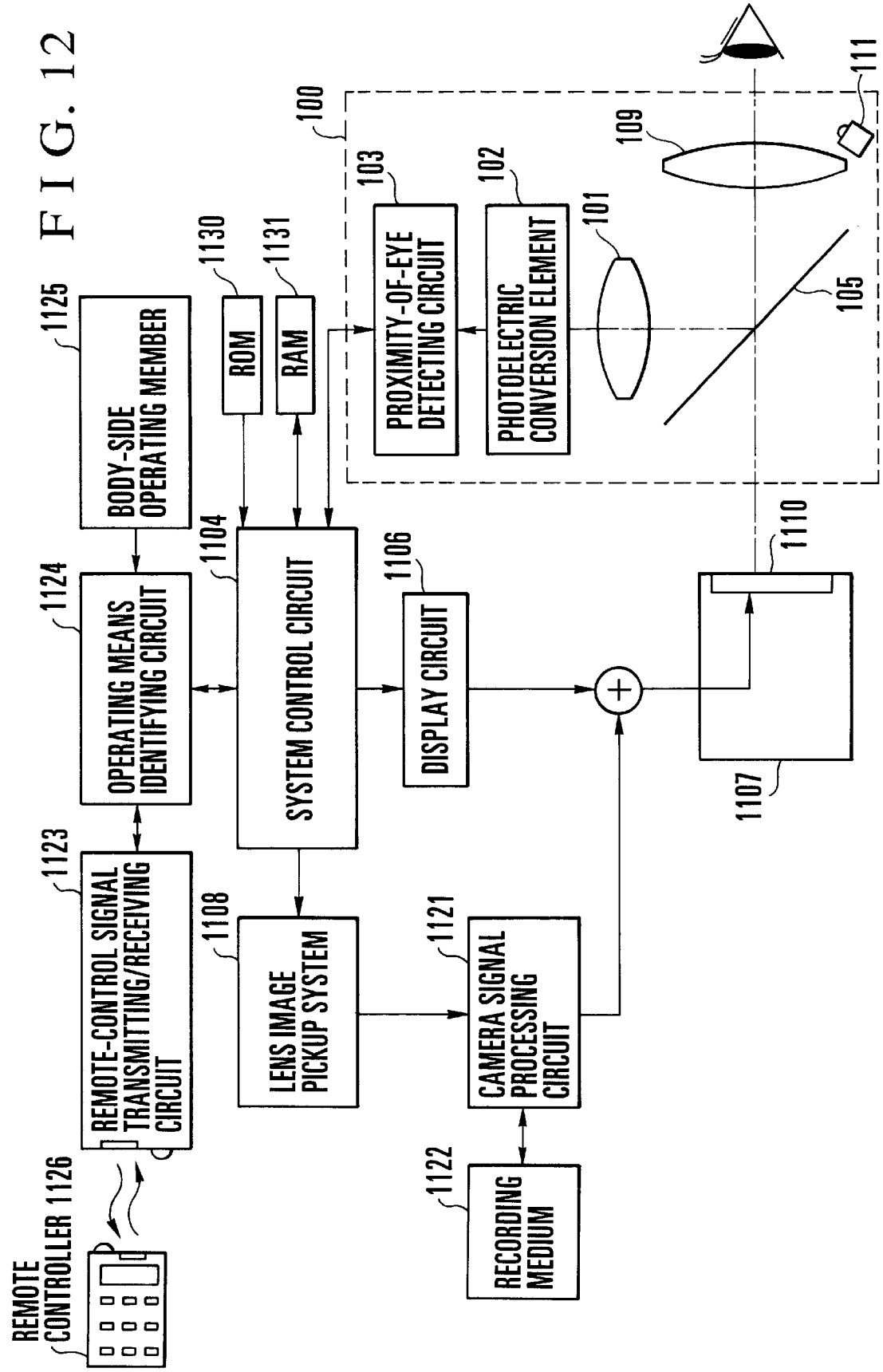
FIG. 12 is a block diagram showing the arrangement of an image pickup apparatus according to a fifth embodiment of the present invention.

FIG. 12 is a schematic block diagram of the arrangement of an image pickup apparatus according to a fifth embodiment.

In the arrangement shown in FIG. 12, a system control circuit 1104 which is composed of a CPU controls various processing operations of the entire image pickup apparatus and performs adjustment of the focus, the aperture, etc., of a lens in a lens image pickup system 1108. A subject image picked up by an image pickup element is converted into an electrical image signal, and the electrical image signal is converted into a standardized video signal such as an NTSC signal by a camera signal processing circuit 1121 and recorded on a recording medium 1122 such as magnetic tape. A ROM 1130 stores a program to be executed by the system control circuit 1104, and a RAM 1131 downloads the program stored in the ROM 1130 and provides a work area for the system control circuit 1104.

A display element 1110 such as an LCD displays a photographed video image, and a display circuit 1106 causes the display element 1110 to display the information required for a photographer, such as a photographing mode, together with the photographed video image. In FIG. 12, a backlight part which illuminates the display element 1110 is omitted for the sake of simplicity.

An operating means identifying circuit 1124 discriminates between a command signal transmitted from a remote controller 1126 which enables a remote operation and a command signal transmitted from a body-side operating member 1125, and sends to the system control circuit 1104 the transmitted command signal and information indicating which of the remote controller 1126 and the body-side operating member 1125 has been operated to transmit the command signal. Each command signal transmitted from the remote controller 1126 is provided with information indicating that the command signal has been transmitted from the remote controller 1126, and the operating means identifying circuit 1124, according to whether there is such information, determines whether the transmitted command signal is the one transmitted from the remote controller 1126 or the one transmitted from the body-side operating member 1125.

A proximity-of-eye detecting part 100 is disposed before an EVF 1107 which includes the display element 1110. This proximity-of-eye detecting part 100 consists of the circuit shown in FIG. 2, and since the description of its operation has been given in connection with the first embodiment, the description is omitted.

Figure 13:
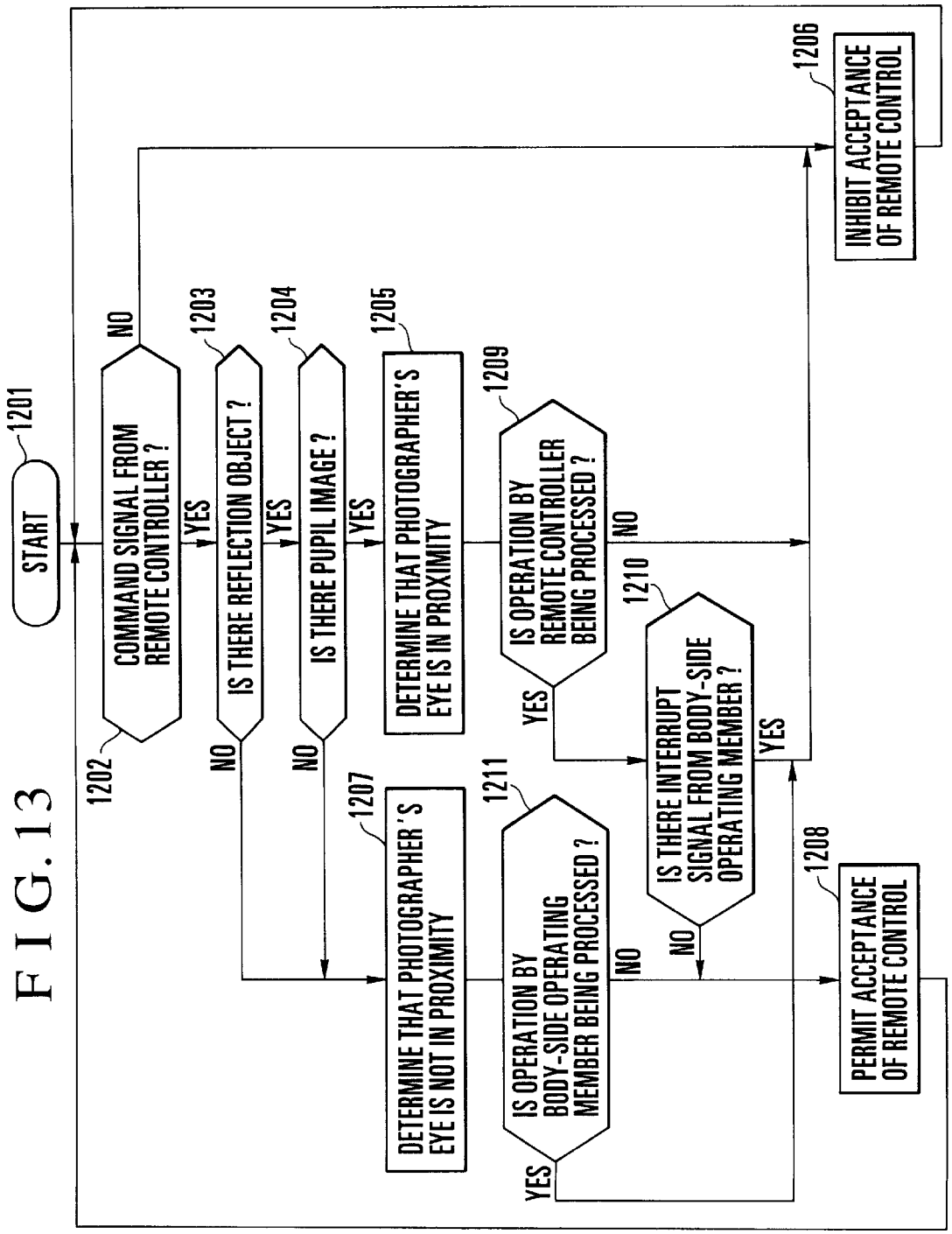
FIG. 13 is a flowchart of the operation of the image pickup apparatus according to the fifth embodiment of the present invention.

FIG. 13 is a flowchart showing the processing sequence of the system control circuit 1104 for executing processing of the operation of the fifth embodiment. An example of the operation of the image pickup apparatus will be described below with reference to FIG. 13.

In Step 1201, the operation of the system control circuit 1104 is started. First of all, the operating means identifying circuit 1124 determines whether the current transmitted signal is a command signal transmitted from the remote controller 1126 or from the body-side operating member 1125 (step 1202).

If it is determined that the current transmitted signal is a command signal transmitted from the body-side operating member 1125, the system control circuit 1104 inhibits acceptance of an operating signal from a remote-control signal transmitting/receiving circuit 1123 (Step 1206).

If it is determined that operation processing to be executed is based on a command signal transmitted from the remote control signal transmitting/receiving circuit 1123, the system control circuit 1104 determines whether a reflection object is present, through a proximity-of-eye detecting circuit 103 (Step 1203).

If it is determined that a reflection object is absent, it is determined that an eye of the photographer is not in proximity to the EVF 1107 (Step 1207), and the system control circuit 1104 permits acceptance of the command signal from the remote controller 1126 (Step 1208). However, even if the proximity of the eye is not detected, if the operation processing based on the command signal transmitted from the body-side operating member 1125 is being executed, the system control circuit 1104 inhibits acceptance of the command signal from the remote controller 1126 (Steps 1211 and 1206).

If it is determined in Step 1203 that there is a reflection object, it is determined whether the edge of a pupil has been detected (Step 1204).

If it is determined that the edge of a pupil has not been detected, it is determined in Step 1207 that the eye of the photographer is not in proximity to the EVF 1107, and the system control circuit 1104 permits acceptance of the command signal from the remote control signal transmitting/receiving circuit 1123.

If it is determined in Step 1204 that the edge of a pupil has been detected, it is determined that the eye of the photographer is in proximity to the EVF 1107 (Step 1205), and the system control circuit 1104 inhibits acceptance of the command signal from the remote controller 1126 (Step 1206).

However, as an exception, if the processing of the operation of the image pickup apparatus is being executed in accordance with a command signal from the remote control signal transmitting/receiving circuit 1123, even if the proximity of the eye is detected, the system control circuit 1104 does not inhibit acceptance of a command signal from the remote control signal transmitting/receiving circuit 1123 (Step 1209). This arrangement enables smooth photography with the image pickup apparatus. However, if the body-side operating member 1125 is operated, the system control circuit 1104 gives priority to the command signal from the body-side operating member 1125 (Step 1210).

In this step, the method of inhibiting acceptance of the operation of the remote control signal transmitting/receiving circuit 1123 may be to inhibit, on the body side, acceptance of the command signal received by the remote control signal transmitting/receiving circuit 1123, or to transmit an operation-inhibiting signal from the body side to the remote control signal transmitting/receiving circuit 1123.

Since the image pickup apparatus is arranged in the above-described manner, if the photographer of the image pickup apparatus is looking through the EVF (the possibility that the photographer may use the remote controller is extremely low), the acceptance of a signal from the remote controller is automatically inhibited. Accordingly, it is possible to avoid operation processing for the image pickup apparatus from being executed in accordance with a remote control signal transmitted from a remote controller of a person other than the user of the image pickup apparatus, so that smooth photography can be achieved.

Figure 14:
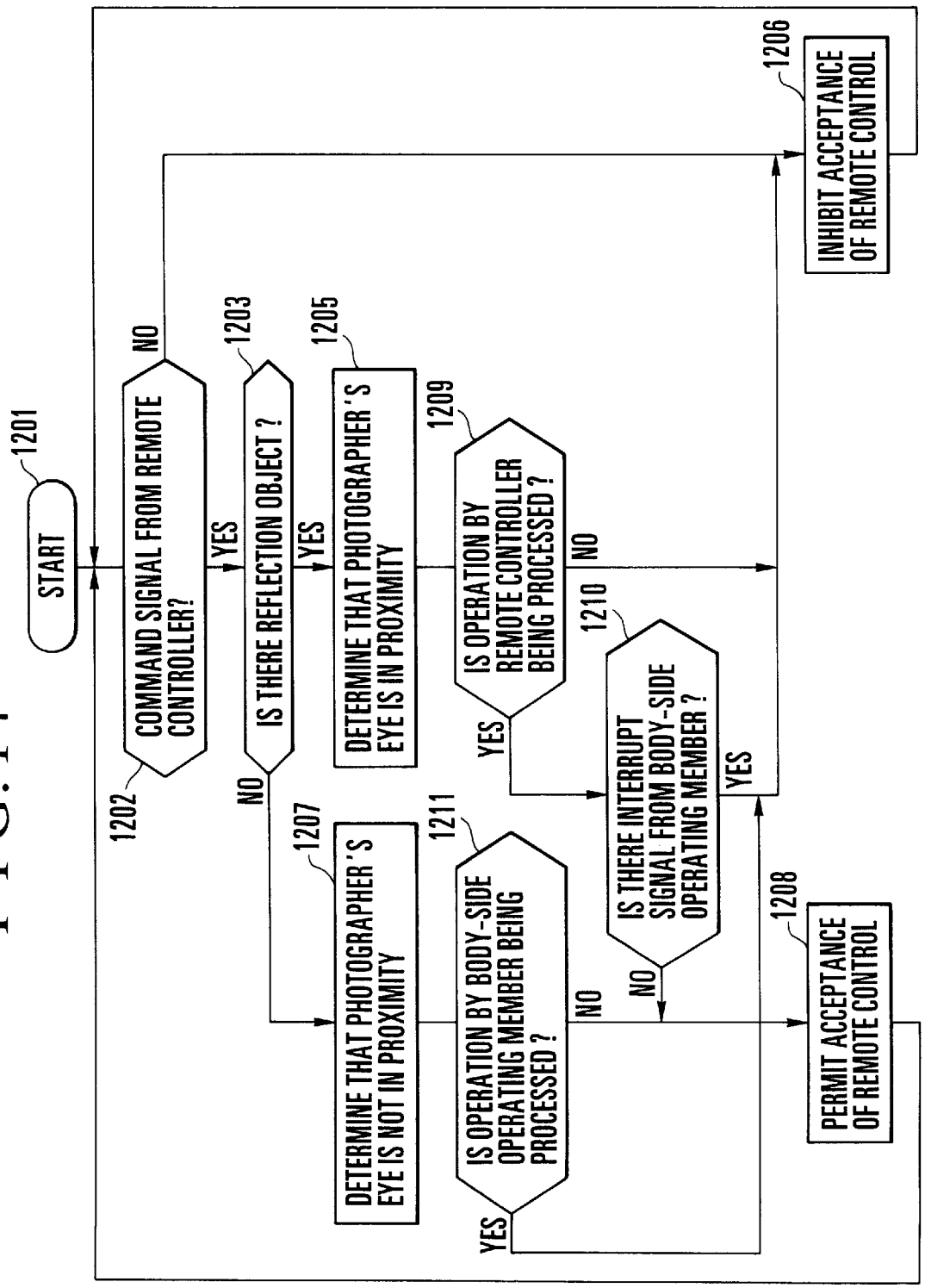
FIG. 14 is a flowchart of the operation of the image pickup apparatus to detect only a reflection object in proximity-of-eye detection according to the fifth embodiment of the present invention.

The above-described embodiment is arranged to perform detection of the pupil of an eye and accurately detect proximity of the eye by means of the circuit consisting of the arrangement of FIG. 2. However, in order to achieve a simple circuit, the circuit shown in FIG. 5(*a*) may be used to detect only the presence or absence of a reflection object. FIG. 14 shows a flowchart of an embodiment which detects only the presence or absence of a reflection object. Since FIG. 14 is identical to FIG. 13 except that detection of a pupil image is not performed in the flowchart of FIG. 14, the description thereof is omitted.

As a matter of course, the proximity-of-eye detecting unit 900 shown in FIG. 8 may be employed for the purpose of proximity-of-eye detection.

What is claimed is:
1. An image pickup apparatus comprising:
   a viewfinder through which to observe a subject;
   a monitor capable of displaying a picked-up image in a direction of a subject side or in a direction of a photographer side;
   first detecting means for detecting whether a photographer is in proximity to said viewfinder;
   changing means for changing an image-displaying direction of said monitor to the direction of the photographer side and to the direction of the subject side;
   second detecting means for detecting the image-displaying direction of said monitor;
   inhibiting means for inhibiting driving of said monitor if said first detecting means detects that the photographer is in proximity to said viewfinder; and
   driving means for driving said monitor if the image-displaying direction of said monitor does not face the direction of the photographer side, even if said first detecting means detects that the photographer is in proximity to said viewfinder.

2. An image pickup apparatus according to claim 1, wherein said first detecting means detects whether an eye of the photographer is in proximity to said viewfinder.

3. An image pickup apparatus according to claim 2, wherein said viewfinder is an electronic viewfinder.

4. An image pickup apparatus according to claim 3, wherein said inhibiting means inhibits the driving of said monitor if said first detecting means detects that the eye of the photographer is in proximity to said viewfinder.

5. An image pickup apparatus according to claim 1, wherein said driving means drives said monitor if the image-displaying direction of said monitor faces the direction of the subject side, even if said first detecting means detects that the photographer is in proximity to said viewfinder.

6. A method of controlling an image pickup apparatus which includes a viewfinder through which to observe a subject and a monitor capable of displaying a picked-up image in a direction of a subject side or in a direction of a photographer side, comprising:
   a first detecting step of detecting whether a photographer is in proximity to said viewfinder;
   a changing step of changing an image-displaying direction of said monitor to the direction of the photographer side and to the direction of the subject side;
   a second detecting step of detecting the image-displaying direction of said monitor;
   an inhibiting step of inhibiting driving of said monitor if it is detected that the photographer is in proximity to said viewfinder; and
   a driving step of driving said monitor if the image-displaying direction of said monitor does not face the direction of the photographer side, even if it is detected that the photographer is in proximity to said viewfinder.

7. A method of controlling said image pickup apparatus according to claim 6, wherein said first detecting step includes detecting whether an eye of the photographer is in proximity to said viewfinder.

8. A method of controlling said image pickup apparatus according to claim 6, wherein said driving step includes driving said monitor if the image-displaying direction of said monitor faces the direction of the subject side, even if it is detected in said first detecting step that the photographer is in proximity to said viewfinder.

9. A storage medium in which is stored a program for executing operation processing for an image pickup apparatus which is provided with a viewfinder through which to observe a subject and a monitor capable of displaying a picked-up image in a direction of a subject side or in a direction of a photographer side, said storage medium permitting the following processing to be executed which comprises the steps of:

detecting whether a photographer is in proximity to said viewfinder;

detecting an image-displaying direction of said monitor;

inhibiting driving of said monitor if it is detected that the photographer is in proximity to said viewfinder; and driving said monitor if the image-displaying direction of said monitor does not face the direction of the photographer side, even if it is detected that the photographer is in proximity to said viewfinder.

10. A storage medium in which is stored a program for executing operation processing for an image pickup apparatus which is provided with a viewfinder through which to observe a subject and a monitor capable of displaying a picked-up image in a direction of a subject side or in a direction of a photographer side, said storage medium permitting the following processing to be executed which comprises the steps of:

detecting whether an eye of a photographer is in proximity to said viewfinder;

detecting an image-displaying direction of said monitor;

inhibiting driving of said monitor if it is detected that the eye of the photographer is in proximity to said viewfinder; and driving said monitor if the image-displaying direction of said monitor does not face the direction of the photographer side, even if it is detected that the eye of the photographer is in proximity to said viewfinder.

11. A storage medium in which is stored a program for executing operation processing for an image pickup apparatus which is provided with a viewfinder through which to observe a subject and a monitor capable of displaying a picked-up image in a direction of a subject side or in a direction of a photographer side, said storage medium permitting the following processing to be executed which comprises the steps of:

detecting whether an eye of a photographer is in proximity to said viewfinder;

detecting an image-displaying direction of said monitor;

inhibiting driving of said monitor if it is detected that the eye of the photographer is in proximity to said viewfinder; and driving said monitor if the image-displaying direction of said monitor faces the direction of the subject side, even if it is detected that the eye of the photographer is in proximity to said viewfinder.

12. An image pickup apparatus comprising:

a viewfinder through which to observe a subject;

a monitor capable of displaying a picked-up image in a direction of a subject side or in a direction of a photographer side;

first detecting means for detecting whether a photographer is in proximity to said viewfinder;

changing means for changing an image-displaying direction of said monitor to the direction of the photographer side and to the direction of the subject side;

second detecting means for detecting the image-displaying direction of said monitor;

inhibiting means for inhibiting driving of a backlight of said monitor if said first detecting means detects that the photographer is in proximity to said viewfinder; and driving means for driving the backlight of said monitor if the image-displaying direction of said monitor does not face the direction of the photographer side, even if said first detecting means detects that the photographer is in proximity to said viewfinder.

13. An image pickup apparatus according to claim 12, wherein said first detecting means detects whether an eye of the photographer is in proximity to said viewfinder.

14. An image pickup apparatus according to claim 13, wherein said viewfinder is an electronic viewfinder.

15. An image pickup apparatus according to claim 14, wherein said inhibiting means inhibits the driving of the backlight of said monitor if said first detecting means detects that the eye of the photographer is in proximity to said viewfinder.

16. An image pickup apparatus according to claim 12, wherein said driving means drives the backlight of said monitor if the image-displaying direction of said monitor faces the direction of the subject side, even if said first detecting means detects that the photographer is in proximity to said viewfinder.

17. An image pickup apparatus comprising:

a viewfinder through which to observe a subject;

a monitor capable of displaying a picked-up image in a first direction or in a second direction which is different from the first direction;

first detecting means for detecting whether a photographer is in proximity to said viewfinder;

changing means for changing an image-displaying direction of said monitor to the first direction and to the second direction;

second detecting means for detecting the image-displaying direction of said monitor;

inhibiting means for inhibiting driving of said monitor if said first detecting means detects that the photographer is in proximity to said viewfinder; and driving means for driving said monitor if the image-displaying direction of said monitor faces the first direction, even if said first detecting means detects that the photographer is in proximity to said viewfinder.

18. An image pickup apparatus according to claim 17, wherein said first detecting means detects whether an eye of the photographer is in proximity to said viewfinder.

19. An image pickup apparatus according to claim 18, wherein said viewfinder is an electronic viewfinder.

20. An image pickup apparatus according to claim 19, wherein said inhibiting means inhibits the driving of said monitor if said first detecting means detects that the eye of the photographer is in proximity to said viewfinder.

21. An image pickup apparatus comprising:

operating means provided at a body of said image pickup apparatus, for generating a signal for operating said image pickup apparatus;

receiving means for receiving, from outside the body, a signal for operating said image pickup apparatus;

displaying means for permitting observation of a subject;

detecting means for detecting whether a photographer is in proximity to said displaying means;

control means for controlling said image pickup apparatus on the basis of the signal generated by said operating means or the signal received by said receiving means; and inhibiting means for inhibiting control based on the signal which is received by said receiving means when said detecting means detects that the photographer is in proximity to said displaying means.

22. An image pickup apparatus according to claim 21, wherein said detecting means detects whether an eye of the photographer is in proximity to said displaying means.

23. A method of controlling an image pickup apparatus provided with a display part which permits observation of a subject, comprising:

an operating step of generating a signal for operating said image pickup apparatus, at a body of said image pickup apparatus;

a receiving step of receiving, from outside the body, a signal for operating said image pickup apparatus;

a detecting step of detecting whether a photographer is in proximity to said display part;

a control step of controlling said image pickup apparatus on the basis of the signal generated in said operating step or the signal received in said receiving step; and an inhibiting step of inhibiting control based on the signal which is received in said receiving step when it is detected in said detecting step that the photographer is in proximity to said display part.

24. A method of controlling an image pickup apparatus provided with a viewfinder, comprising:

an operating step of generating a signal for operating said image pickup apparatus, at a body of said image pickup apparatus;

a receiving step of receiving, from outside the body, a signal for operating said image pickup apparatus;

a detecting step of detecting whether an eye of a photographer is in proximity to said viewfinder;

a control step of controlling said image pickup apparatus on the basis of the signal generated in said operating step or the signal received in said receiving step; and an inhibiting step of inhibiting control based on the signal which is received in said receiving step when it is detected in said detecting step that the eye of the photographer is in proximity to said viewfinder.

25. A storage medium in which is stored a program for executing operation processing for an image pickup apparatus provided with a display part which permits observation of a subject, said storage medium permitting the following processing to be executed which comprises the steps of:

generating a signal for operating said image pickup apparatus;

receiving, from outside the image pickup apparatus, a signal for operating said image pickup apparatus;

detecting whether a photographer is in proximity to said display part;

controlling said image pickup apparatus on the basis of the signal generated or the signal received from outside the image pickup apparatus;

inhibiting control based on the signal which is received when it is detected that the photographer is in proximity to said display part.

26. A storage medium in which is stored a program for executing operating processing for an image pickup apparatus provided with a viewfinder, said storage medium permitting the following processing to be executed which comprises the steps of:

generating a signal for operating said image pickup apparatus;

receiving, from outside the image pickup apparatus, a signal for operating said image pickup apparatus;

detecting whether an eye of a photographer is in proximity to said viewfinder;

controlling said image pickup apparatus on the basis of the signal generated or the signal received from outside the image pickup apparatus; and inhibiting control based on the signal which is received when it is detected that the eye of the photographer is in proximity to said viewfinder.

* * * * *